Sept. 8, 1970  W. L. BOURLAND  3,527,675
SALT WATER DISTILLATION AND CONDENSATION SYSTEM AND METHOD
Filed May 16, 1968  2 Sheets-Sheet 1

INVENTOR
William L. Bourland

BY Alexander B. Blair
ATTORNEY

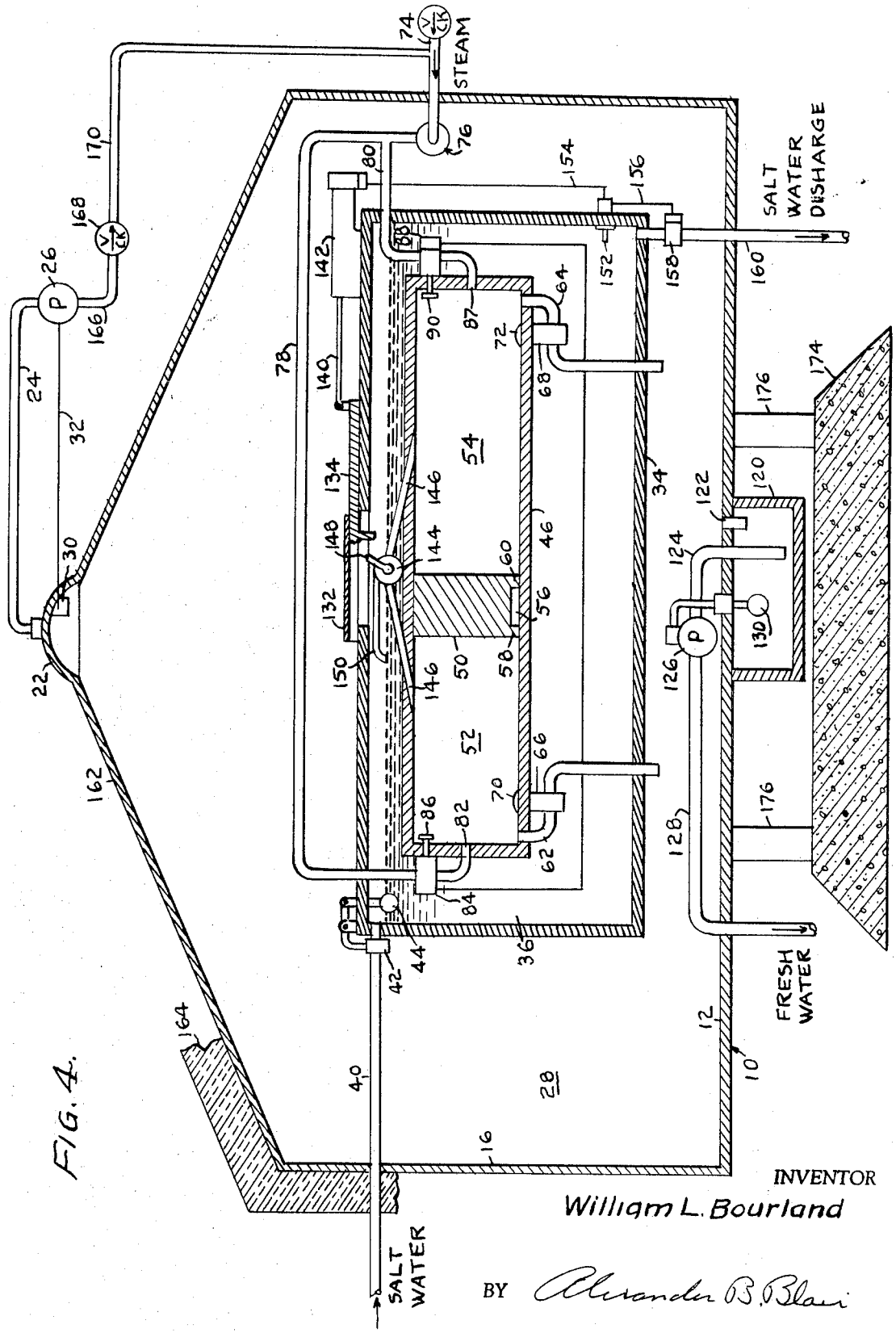

United States Patent Office 3,527,675
Patented Sept. 8, 1970

3,527,675
SALT WATER DISTILLATION AND CONDENSATION SYSTEM AND METHOD
William L. Bourland, 6350 Everest Way,
Sacramento, Calif. 95842
Filed May 16, 1968, Ser. No. 729,715
Int. Cl. B01d 1/14; C02b 1/06
U.S. Cl. 203—11                                        12 Claims

ABSTRACT OF THE DISCLOSURE

A condensation system and method for the extraction of fresh water from salt water and the like which includes an outer vessel which is cooled to condense and collecct vapors, a salt water containing vessel arranged in the outer vessel, a cylinder with a freely slidable piston inside the salt water containing vessel, and interconnecting systems for supplying steam to the inside cylinder alternately at opposite sides of the piston therein and reciprocably moving the piston and condensing the steam in the cylinder, thereby transferring latent heat to the salt water to produce vapor therefrom which is condensed and collected in the outer vessel.

CROSS-REFERENCES TO RELATED APPLICATIONS

This application is an improvement over my copending applications, Ser. Nos. 544,013, filed Apr. 20, 1966 (now Pat. No. 3,397,119) and 632,693, filed Apr. 21, 1967 (now Pat. No. 3,397,116).

BACKGROUND OF THE INVENTION

The invention relates to steam condensers and more particularly to the use of heat from the condensation of steam for extracting fresh water from salt, brackish or polluted water.

The prior art discloses a substantial variety of steam generation and condensation system for the production of fresh water from salt water. One of the major problems in such systems relates to the prevention of scale from the salt water, or the removal of scale from the condenser's parts. No satisfactory solution for such problem has been proposed.

SUMMARY OF THE INVENTION

The invention comprises an outer receptacle of substantial size acting as a condenser, a relatively large container therein to which salt water or the like is supplied, and a cylinder within the latter receptacle having a piston therein which is freely slidable from end to end of the cylinder. Steam from a suitable source is supplied to alternate ends of the cylinder, that is, to opposite sides of the piston therein, and maintained at sub-atmospheric pressure. When steam is supplied to one end of the cylinder, the chamber at the adjacent side of the piston expands without any expansion of the steam, for reasons referred to below, while steam at the opposite side of the piston, disconnected at this time from the source, condenses as the associated expansible chamber contracts, without appreciably changing the temperature or pressure in either end of the cylinder.

When the piston reaches the end of the contracting chamber of the piston, it operates means for draining water of condensation from such end of the cylinder and then operates suitable valve mechanism for connecting such end of the cylinder to the source of steam while disconnecting the previously expanding cylinder chamber from the source.

The piston now starts its return movement. The previously contracting chamber of the cylinder expands due to the flow of steam thereinto, while the previously expanding cylinder chamber now contracts as steam condenses therein. Adjacent the end of the piston stroke now being considered, the presently contracting cylinder chamber is open to a discharge line to discharge water of condensation from the cylinder. When the piston reaches the end of its second stroke as now considered, the steam connections to the ends of the cylinder are again reversed. Thus the piston is steadily and rather rapidly reciprocated.

To prevent scaling in the salt water receptacle, it is necessary to maintain such receptacle at a relatively low temperature. The present system accomplishes this by maintaining a partial vacuum in the salt water receptacle. At the same time, to effect an efficient transfer of heat from the cylinder to the salt water in which this cylinder is immersed, it is necessary to maintain the temperature in both ends of the cylinder at a somewhat higher temperature than in the salt water receptacle, and this is accomplished by supplying steam to alternate ends of the cylinder at a relatively low temperature and pressure. As water is evaporated from the salt water container, its temperature is maintained at a relatively low point because of its arrangement within a condenser.

In order to supply steam to the cylinder at a relatively low temperature and pressure, suitable control valve mechanism is interposed between the steam source and the pipe lines leading to opposite ends of the cylinder. In the present instance, the control valve mechanism operates in accordance with temperature to close communication between the steam source and the ends of the cylinder when steam being supplied to the cylinder rises to a predetermined point. If the steam supplied to the cylinder drops below said predetermined temperature, the automatic valve mechanism opens to supply steam until the proper temperature is again built up. In practice, the temperature in each end of the cylinder is maintained at approximately 160°, and the pressure of the steam is controlled not only by the valve mechanism but also by the condensation of the steam in the cylinder and the transferring of heat from the cylinder to the salt water.

It is the continuous admission of steam to one end of the cylinder that effects relatively rapid movement of the piston to the other end of the cylinder, there being no building up of pressure in the end of the cylinder to which steam is being supplied. Since steam is being rapidly condensed in the other end of the cylinder, it would seem that there would be a tendency for the steam pressure to drop. This, however, does not take place since with the freely slidable piston, the exhaust end of the cylinder is being constantly reduced in capacity due to the movement of the piston. Thus, very slight pressure differentials in the end of the cylinder are necessary for the rapid movement of the freely slidable piston. The latent heat of the steam is transferred through the wall of the cylinder to the salt water, and as the piston approaches each end of the cylinder, such end of the cylinder is opened to a pipe to discharge water of condensation and steam and any gas or air entrained therein to the condenser. It is the relatively fine controlling of the steam temperatures and pressures in the cylinder with a lower pressure maintained in the salt water which renders the present system more highly efficient than the systems of my copending applications referred to, while at the same time preventing the salt water from causing scaling in its receptacle.

In common with my copending application referred to, a sensor, affected by the salt water, drains such water from the salt water receptacle when the salinity of the water increases to a predetermined point. Simultaneously with such operation, moisture is supplied from opposite ends of the cylinder to the salt water to reduce the salinity thereof. Additional salt water is supplied to the salt water receptacle by suitable float control means to maintain salt water at a proper level to completely immerse the cylinder. Also in common with my copending applications, fresh water from the condenser flows into a sump from which it is pumped, in accordance with the operation of float control means to a suitable fresh water collecting device.

BRIEF DESCRIPTION OF THE DRAWINGS

FIG. 4 is a sectional view of a modified form of apparatus.

Referring to FIG. 1, the numeral 10 designates a relatively large condenser having a bottom wall 12, a top wall 14 and end walls 16 and 18. In this form of the invention, in which parts of the condenser casing have been shown broken away, cooling pipes 20 traverse the upper part of the condenser to control the temperature therein. The top wall 14 is provided with a dome 22 having an outlet pipe 24 in which is connected a pump 26 to maintain a partial vacuum in the condenser chamber 28 within the casing 10. A sensor 30 is arranged in the dome 22 and connected as at 32 to the pump 26 to energize the pump when pressure in the chamber 20 increases above a predetermined point, thus maintaining relatively constant the partial vacuum in the chamber 28.

Figure 1:
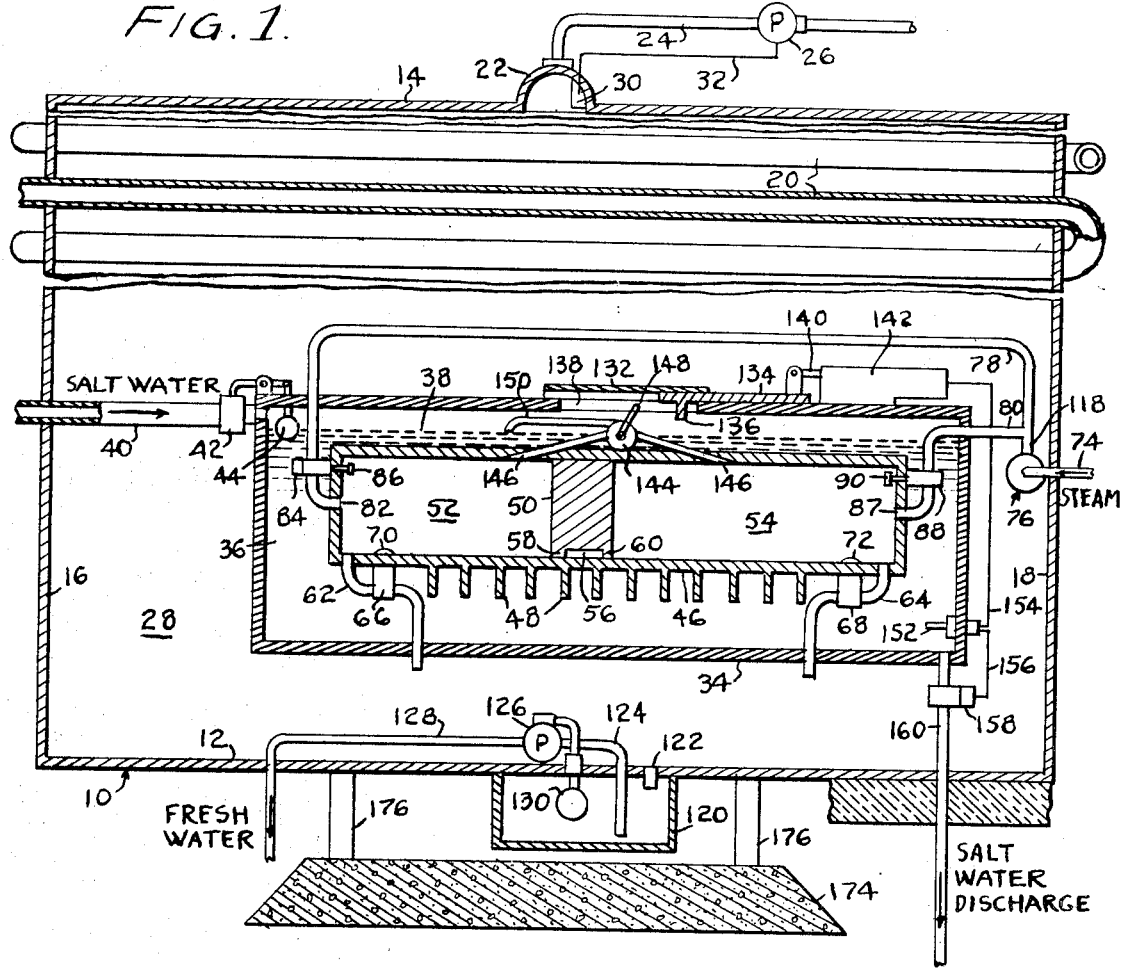
FIG. 1 is a sectional view of one form of apparatus for practicing the method.

Within the chamber 28 is arranged an elongated receptacle 34 containing a body of salt water 36 up to the level 38. Salt water is supplied to the receptacle 34 through an inlet pipe 40, the salt water flowing through a valve 42 controlled by a float 44 within the receptacle 34. As fresh water is evaporated from the salt water, the level 38 will drop slightly and the float 44 will open the valve 42 to admit more salt water into the receptacle 34.

Immersed in the body of salt water 36 is arranged a cylinder 46 shown in the present instance as having radiating fins 48 to assist in the rapid transfer of heat from the cylinder 46 to the body 36 of salt water. A piston 50 is reciprocable in the cylinder 46 and slides freely therein. This piston divides the cylinder 46 into two chambers 52 and 54. The piston 50 is provided in the bottom thereof with a recess 56 forming opposite flanges 58 and 60 for a purpose to be described.

The respective ends of the cylinder 46 are connected to discharge pipes 62 and 64, the lower ends of which extend through the bottom wall of the receptacle 34 to discharge fluid into the condenser. The pipes 62 and 64 are respectively controlled by valves 66 and 68, and these valves in turn are controlled by diaphragm operators 70 and 72 adapted to be respectively operated by the flanges 58 and 60 at the ends of the stroke of the piston 50.

Steam is alternately supplied to the cylinder chambers 52 and 54, and to this end a steam pipe 74 is connected to a source of steam which flows through an automatic control valve mechanism 76, further described below. From this valve mechanism steam pipes 78 and 80 supply steam alternately to the cylinder chambers 52 and 54. The steam pipe 78 communicates with the cylinder chamber 52 at 82, this pipe having interposed therein a valve 84 operated by a sensor 86. The steam pipe 80 communicates with the chamber 54 as at 88, and the flow of steam through the pipe 80 is controlled by a valve 88 operable by a sensor 90. When the valve 88 is open, steam is admitted to the chamber 54 and the piston 50 moves to the left. Steam in the chamber 52 will be condensed and when the flange 58 rides over the diaphragm 70, the valve 66 opens and water and any other gaseous fluids present in the chamber 52 will be discharged freely from the bottom of the pipe 62 into the condensing chamber 28. The piston 50 then contacts with the sensor 86 to open the valve 84. This sensor also controls the valve 88, the latter being closed simultaneously with the opening of the valve 84. Steam will now flow through the pipe 78 into the chamber 52 while the chamber 54 will be cut off from the steam source. The piston 50 will now move to the right as steam is admitted into the chamber 52, the steam in the chamber 54 progressively condensing and thus holding down the pressure in the chamber 54. As the flange 60 rides over the diaphragm 72, the pipe 64 will be opened by the valve 68 to discharge fluids into the condensing chamber 28. It will be apparent that when each sensor 86 and 90 is operated, the recess 56 will be in a position releasing the associated diaphragm 70. At each end of the stroke, therefore, the valve 66 or 68 will close and will open momentarily after the piston reverses its movement. This brief momentary opening of the valve 66 or 68 is necessary in order to maintain a lower pressure in the receptacle 34 than in the cylinder 46. This is necessary for the rapid transfer of heat through the cylinder 46 to the salt water body 36.

Figure 2:
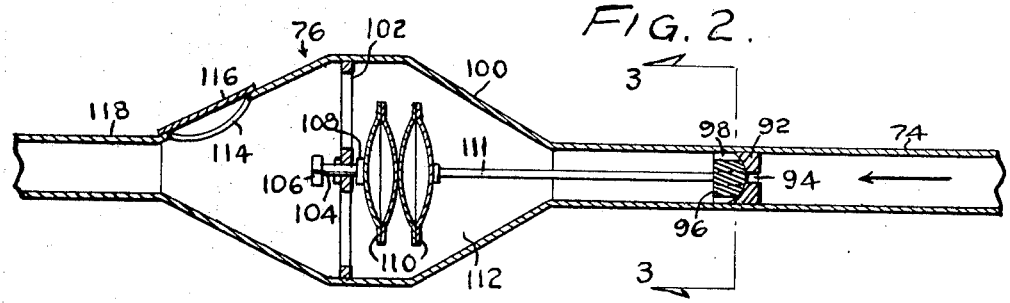
FIG. 2 is an enlarged fragmentary sectional view through the automatic valve mechanism for controlling the admission of steam to the cylinder.
Figure 3:
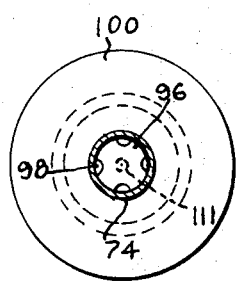
FIG. 3 is a detailed section on line 3—3 of FIG. 2.

The valve mechanism for controlling the temperature and pressure of steam admitted to the cylinder 46 is shown in FIG. 2. The steam pipe 74 is provided with a valve seat 92 therein having a steam opening 94 therethrough. This sea is normally engaged by a valve 96 and longitudinal external grooves 98 for admitting steam through the port 94 when the valve 96 is opened. The pipe 74 is connected to an enlarged casing 100 having a spider 102 therein in which is threaded a stem 104 provided with a screw head or the like 106. The right hand end of the stem 104 is provided with a head 108 engaging the adjacent of a pair of heat responsive diaphragms 100. The diaphragm opposite the head 108 is connected by a rod 112 to the valve 96. It will be noted that the diaphragms are arranged remote from the valve seat 92 and valve 96, and the purpose of this is to protect the diaphragms 110 against being influenced by the heat of the steam at the inlet side of the valve seat 92. The casing 100 thus forms a chamber 112, and when the temperature of this chamber rises to a predetermined point, the expansion of the diaphragms 110 will close the valve 96. These diaphragms contract upon the drop in temperature below the predetermined point to unseat the valve 96 and admit more steam to the chamber 112.

The casing 100 is provided with an opening 114 normally covered by a plate 116 which can be removed for the insertion of a tool to adjust the stem 104 and thus adjust the temperature at which the diaphragms 110 open and close the valve 96. This adjustment is unnecessary under most conditions, for example, when the salinity of the water from which fresh water is to be extracted is known, in which case the control valve mechanism may be preadjusted to predetermine the temperature in the chamber 112. The chamber 112 is connected to an outlet pipe 118 which, in turn, is connected to the pipes 78 and 80 (FIG. 1).

Beneath the condenser 10 is arranged a sump 120 communicating with the chamber 28 as at 122. An outlet pipe 124 has its end projecting downwardly into the sump 120 and leads to a pump 126, the outlet pipe 128 of which projects downwardly through the bottom wall 12 of the condenser, and this pipe leads to a suitable collecting means for the fresh water. A float 130 in the sump 120 operates the pump whenever the water level in the sump rises to a predetermined point.

The top wall of the receptacle 34 is provided with a guide 132 in which is reciprocable a slide 134 having a depending finger 136 projecting through an opening 138 in the top wall of the receptacle 34. The slide 134 is connected as at 140 to the armature of a solenoid 142 so that operation of this solenoid moves the slide 134 to the left in FIG. 1.

A valve 144 communicates as at 146 with the respective chambers 52 and 54 of the cylinder, and the valve is provided with an operating handle 148 arranged in the path of travel of the finger 136. When the valve 144 is opened, fluid is supplied to a discharge pipe 150 and water vapor is supplied to the body of salt water 36.

A sensor 152 projects through one end wall of the receptacle 34 and is connected as at 154 to the solenoid 142. The sensor also is connected as at 156 to a solenoid valve 158 controlling an outlet pipe 160, the upper end of which communicates with the interior of the receptacle 34. If the salinity of the salt water increases to a predetermined point, the sensor 152 opens the valve 158 to discharge salt water through the pipe 160 and operates the solenoid 142 to open the valve 144 and supply moisture to the salt water to reduce its salinity. As salt water is discharged through the pipe 160, the float 44 opens the valve 42 to supply additional salt water of lower salinity to the receptacle 34.

In the form of the invention shown in FIG. 4, most of the parts are identical with the form of the invention shown in FIG. 1. Identical parts, accordingly, have been indicated by the same numerals.

In the modified form of the invention, the cooling pipes 20 are eliminated. In this case the condenser 10, instead of having a flat top wall 14, has its top wall conical as at 162. In this form of the invention the condenser is surrounded by a thick insulating wall, a portion of which has been shown and indicated by the numeral 164. In the first form of the invention, the outlet of the pump 126 can discharge moisture from the condenser 10 at any desired point. In the form of the invention in FIG. 4, the pump 26 has its outlet pipe 166 connected to a check valve 168, the outlet 170 of which supplies moisture to the steam pipe 74 so that steam from the pipe 170 will be reused. The pipe 74 is provided with a check valve 172. The check valve 168 opens at a predetermined pressure and supplies steam and any other fluid to the pipe 74. If this pressure should be greater than the pressure in the steam source, the valve 172 closes. The remaining parts of FIG. 4 operate in the same manner as the elements of FIG. 1. If desired, instead of connecting the pipe 170 to the pipe 74, it may be connected to the pipe 74 of FIG. 1 instead of using a steam source therefor, in which case the apparatus of FIG. 1 will act as a second condenser in a system. This idea can be substantially multiplied as will be apparent.

OPERATION

Most of the operation of the apparatus and the method involved will be apparent from the foregoing description. In FIG. 1, for example, steam will be supplied to pipe 74 through the automatic valve mechanism of FIG. 2. The admission of steam to the chamber 112 may be controlled either in accordance with temperature or pressure, and temperature is employed in FIG. 2. Steam is admitted at low pressure and low temperature to the chamber 112, thus to the respective ends of the cylinder 46. The rate of heat transfer from the cylinder to the salt water and the rate of condensation is such that the steam in both chambers is maintained at approximately the same temperature. In practice, the temperature of the steam in the chambers 52 and 54 preferably will be about 160° F., which will be approximately the boiling point at the lowered pressure controlled by the valve mechanism of FIG. 2. As stated, there is no expansion of the steam whichever chamber 52 or 54 is connected to the steam source, movement of the freely movable piston 50 being accomplished by the admisison of more steam. The pressure in opposite ends of the cylinder 46 will remain substantially constant except that in the retracting chamber of the cylinder, there will be a sufficient drop in pressure to cause the slight differential pressure necessary for movement of the piston 50. This piston moves relatively rapidly and can so move because of the rapid condensation of the steam in the two cylinder chambers.

The pressure in the receptacle 34, by operation of the pump 26, is maintained below the pressure in the cylinder to accomplish the necessary high rate of heat transfer through the cylinder 46 to the salt water. The receptacle 34 is subject to the low pressure in the condenser 28 by communication of the receptacle 34 with the condenser chamber through the port 138. The temperature in the chamber 28 is maintained preferably at about 100° F.

Accordingly, the heat transmitted to the body of salt water evaporates the latter at a relatively low temperature, and the evaporating moisture is supplied through port 138 to the condensing chamber 28. The water of condensation of the steam is also supplied to the condenser chamber 28, thus completely avoiding any waste of water from the steam source.

As in the case of the systems described in my copending applications, the apparatus of FIG. 4, for example, may be immersed in a body of salt water, for example, the ocean. The apparatus may be supported on a base 174 connected to the bottom wall of the condenser 10 as at 176. In the case of a submerged apparatus, the elements 176 may be straps, since the displacement of the apparatus is such that it will be buoyant.

From the foregoing it will now be seen that there is herein provided an improved Salt Water Distillation and Condensation System and Method which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

What is claimed is:

1. In a system for producing fresh water from salt water or the like which includes a source of steam and a relatively large condenser for collecting fresh water condensate, the improvement which comprises an elongated cylinder arranged within said condenser and having a freely movable piston dividing it to form alternately expansible and contractible chambers, means for supplying relatively low pressure and low temperature steam alternately to said chambers to reciprocate said piston whereby one chamber expands while the other contracts, means operable for feeding to said condenser fresh water condensate from each chamber near the end of the contracting stroke of said piston, a receptacle for containing body of salt water in heat exchange relationship with said cylinder whereby latent heat occurring when the steam is condensed is transferred to said body of salt water, said cylinder being completely immersed in the body of salt water, and means comprising a vacuum pump in communication with said condenser and said receptacle which is operable responsive to a pressure sensor in said condenser for maintaining the pressure in the condenser and in said receptacle below the pressure of the steam in said cylinder.

2. A system according to claim 1 wherein said means for supplying low pressure and low temperature steam alternately to said cylinder chambers comprises a steam line from a source, a valve seat in said steam line, and a valve device for limiting the admission of steam from said steam pipe to said cylinder chambers so that the steam is supplied to said chambers at a relatively low pressure and temperature.

3. A system according to claim 2 wherein said valve device comprises a valve engageable with said seat, a casing at the side of said valve seat opposite said source, a heat responsive device in said casing for controlling said valve, said chamber being alternately connectable to said chambers for limiting the supply of steam from said steam pipe to said chambers to maintain at a relatively low pressure the steam admitted to said chamber.

4. A system according to claim 3 wherein said heat responsive device has a relatively long stem connecting it to said valve so that said heat responsive device is remote from said valve to minimize the influencing of said heat responsive device by steam in said steam pipe.

5. A system according to claim 1 provided with means for maintaining the surface pressure of the body of salt water low enough so that the boiling point of the salt water is at a substantially lower temperature than the condensing temperature of the steam in said cylinder.

6. A system according to claim 1 wherein the receptacle for the body of salt water communicates at its top with the condenser, and means for maintaining pressure in the condenser and hence the surface pressure of the salt water low enough so that the boiling point of the salt water is at a lower temperature than the condensing temperature of the steam in said cylinder.

7. In a process for producing fresh water from salt water by evaporation of the salt water and condensation of the resultant vapor to produce fresh water condensate in a condensing chamber, the improvement wherein steam at a relatively low pressure and low temperature is alternately compressed and expanded in a pair of alternately compressible and expandible chambers of a cylinder at opposite sides of a freely movable piston and wherein one cylinder chamber expands while the other contracts upon reciprocation of the piston, maintaining a body of salt water in heat exchange relationship with said cylinder chambers, connecting each cylinder chamber to a condenser as such cylinder chamber reaches its limit of contraction to drain condensate into said condenser, the rate of heat exchange between said cylinder chambers and the body of salt water and the temperature of the steam supplied to said cylinder chambers being such that the steam in both cylinder chambers will be maintained approximately at the same temperature and pressure, and maintaining the surface pressure on the body of salt water below the pressure in said cylinder chambers.

8. A process according to claim 7 wherein said cylinder chambers are constantly immersed in the body of salt water.

9. A process according to claim 8 wherein the surface of the salt water is open to the condenser to supply fresh water condensate to the latter to be condensed therein, and evacuating the condenser to maintain the pressure therein, and consequently the surface pressure on the body of salt water below the pressure in said cylinder chambers.

10. In a process for producing fresh water from salt water by evaporation of the salt water and condensation of the resultant vapor to produce fresh water condensate in a condensing chamber, the improvement which comprises supplying steam at a relatively low pressure and low temperature to an expansible chamber of a cylinder at one side of a freely movable piston in heat transferring relationship with a body of salt water, the temperature of the steam and the rate of heat transfer to the salt water being such that steam in the expansible chamber is maintained below atmospheric pressure, contracting said expansible chamber, opening such chamber to a condenser to supply water from said expansible chamber to the condenser, and maintaining the surface pressure of the salt water below the pressure in said expansible chamber.

11. The process defined in claim 10 wherein the pressure in the condenser is maintained at approximately the surface pressure on the salt water.

12. The process defined in claim 10 wherein the surface of the salt water is open to the condenser to supply fresh water vapor thereto, and evacuating the condenser to maintain the pressure therein and the surface pressure on the salt water at a point below the pressure in the expansible chamber.

References Cited

UNITED STATES PATENTS

| | | | |
|---|---|---|---|
| 2,185,595 | 1/1940 | Kleinschmidt | 202—187 X |
| 2,339,862 | 1/1944 | Kleinschmidt | 203—2 |
| 3,183,174 | 5/1965 | Williamson | 203—10 |
| 3,290,229 | 12/1966 | Brown | 202—177 |
| 3,342,703 | 9/1967 | Leach | 203—7 X |
| 3,390,057 | 6/1968 | Day | 203— 11 X |
| 3,420,745 | 1/1969 | Schlueter | 202—160 |
| 3,397,119 | 8/1968 | Bourland | 203—11 |
| 3,425,235 | 2/1969 | Cox | 62—58 |

FOREIGN PATENTS 575,714  1/1897  Great Britain.

NORMAN YUDKOFF, Primary Examiner

F. E. DRUMMOND, Assistant Examiner

U.S. Cl. X.R.

202—160, 185; 203—100